United States Patent Office 3,223,242
Patented Dec. 14, 1965

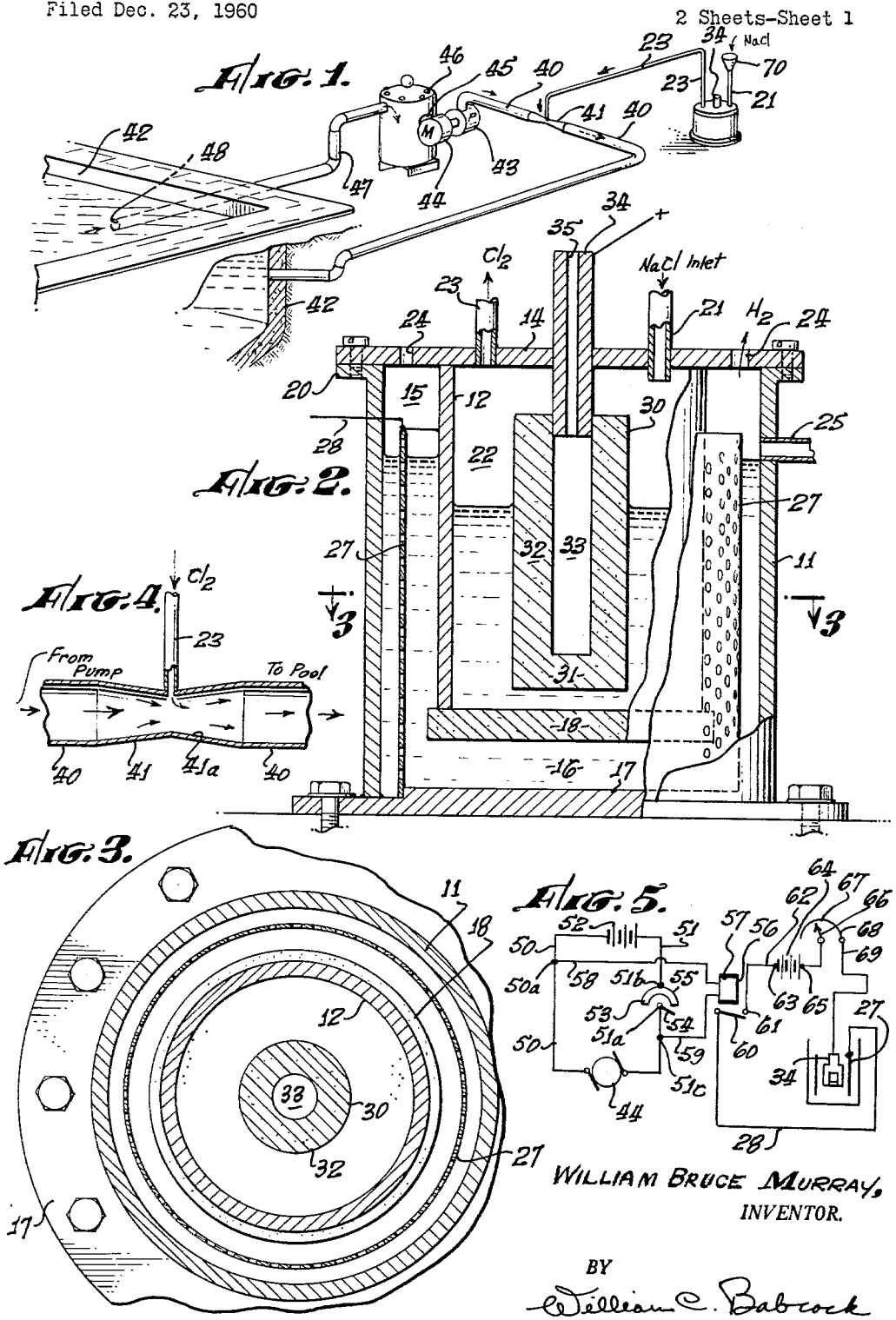

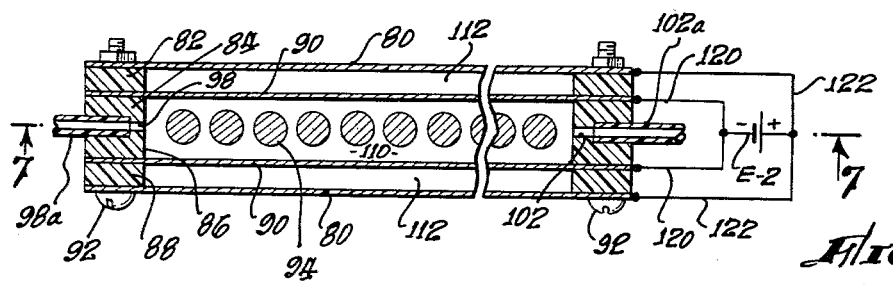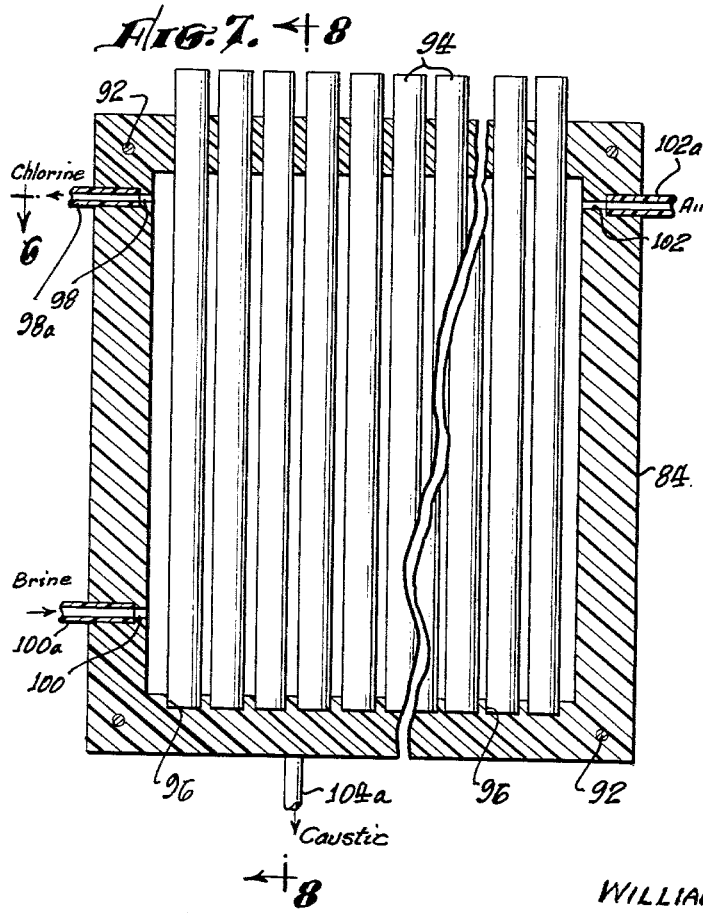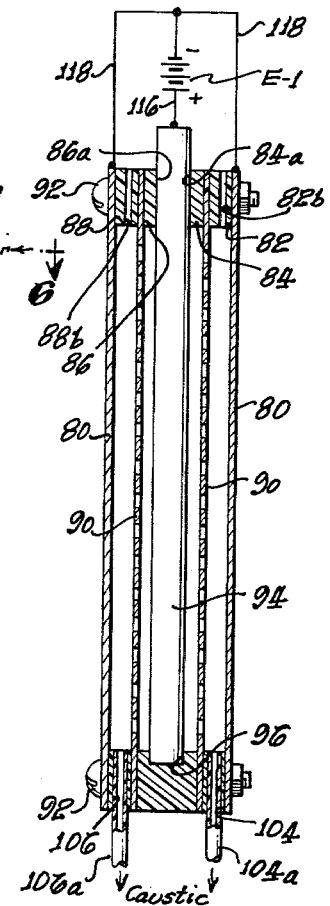

3,223,242
WATER TREATING DEVICE AND ELECTRO-
LYTIC CELLS FOR USE THEREWITH
William Bruce Murray, 4523 Fairway Drive,
Lakewood, Calif.
Filed Dec. 23, 1960, Ser. No. 77,991
9 Claims. (Cl. 210—139)

The present invention relates generally to the treatment of water, and more particularly to apparatus for use in the treatment of water in a swimming pool wherein the water is recirculated and filtered.

In a swimming pool used by a number of persons, it will be obvious that the pool water must at all times be maintained in a proper sanitary condition to avoid any possibility of transmission of disease. To maintain the pool water in this condition, sterilization is required, as well as filtration to remove organic material such as lint, strands of hair, and the like, which tend to facilitate the growth of bacteria in the pool water. Also, sterilization of pool water is highly desirable in combatting the growth of algae, which is not only undesirable from an appearance standpoint, but if allowed to develop over a long period of time will result in clogging of the pool filter to the extent that recirculation of the water is seriously impeded.

Sterilization of swimming pool water is normally accomplished by adding chlorine thereto. In large public pools the chlorine is added to the water in small amounts in the gaseous state from a cylinder of liquid chlorine. A chlorinator of this type is initially costly, and for this reason is rarely used in private residential swimming pools. The advantages of sterilizing swimming pool water by the use of liquid chlorine are that the chlorine does not appreciably change the pH of the water, and adds no other minerals or chemicals to the water.

Sterilization of water in the normal residential swimming pool is normally carried out by adding a chlorine-containing chemical such as sodium hypochlorite, which is unstable at the temperature of the water in the pool, and when exposed to sunlight, breaks down into one or more soluble chemicals with the concurrent liberation of chlorine. This mode of sterilization is relatively inexpensive, and eliminates the handling of liquid chlorine which is a most dangerous and hazardous material.

The primary disadvantage in sterilizing swimming pool water by the addition of unstable chlorine-containing chemicals is that as these chemicals break down to liberate the chlorine, the amount of salts or minerals in the pool water is increased. Any increase in the mineral or chemical content of swimming pool water is undesirable, for inasmuch as the pool water is exposed to the sun, the water is constantly evaporating, whereby the mineral content in the water remaining in the pool becomes more and more concentrated. Ultimately, the mineral and chemical content of the water in the pool may become so great that unsightly solids begin to precipitate onto the sides of the pool.

Also, the addition of chlorine-containing chemicals to swimming pool water tends to vary the pH thereof, normally to the alkaline side. As a result, hydrochloric acid must be added to the pool water from time to time to maintain the pH of the pool water at a value between 7.4 and 7.8. If the pH of the pool water drops below 7.4 the possibility of extensive corrosion of metallic fittings in the metallic recirculation system of the pool exists. Also, if the pool rises to a pH above 8, the potency of the liberated chlorine used in sterilizing the water is reduced.

The primary object in devising the present invention is to provide an electrically operated apparatus for using same particularly well adapted for use with a swimming pool having a timer-controlled water recirculating system, and when so used sterilizes the water with gaseous chlorine to substantially kill all bacteria in the water, and destroy the growth of algae without appreciably changing the pH of the swimming pool water.

Another object of the invention is to provide an inexpensive, electrolytic cell in which chlorine is produced from brine with a high degree of electrical efficiency, that is automatic in operation, simple to install, and requires a minimum of maintenance attention.

A further object of the invention is to provide an electrolytic cell for the production of chlorine that operates at maximum efficiency when a portion thereof is maintained below the pressure of the ambient atmosphere, which reduced pressure is effected by the cooperative action of the water-circulating portion of a swimming pool system.

Yet another object of the invention is to supply an electrically operated chlorine generator that only operates during recirculation of the water in the swimming pool.

A still further object of the invention is to continuously supply a stream of gaseous chlorine to a stream of recirculated swimming pool water in a restricted passage where the percentage of chlorine in the water is so high that even the most hardy bacteria will be destroyed instantly as it moves through said passage.

Yet another object of the invention is to supply apparatus for use in sterilizing swimming pool water by the use of gaseous chlorine, but one that is completely free of the hazards involved in using liquid chlorine.

Still a further object of the invention is to provide a high efficiency chlorine generator in the form of an electrolytic cell in which substantially all the electrical energy is used to produce gaseous chlorine and chloride-free sodium hydroxide, with the formation of sodium hypochlorite in the cell being practically eliminated.

These and other objects and advantages of the invention will become apparent from the following description of a preferred and certain alternate forms thereof, and from the accompanying drawings illustrating the same in which:

FIGURE 1 is a perspective view showing the water circulation system of a swimming pool with the electrolytic cell of the present invention connected thereto;

FIGURE 2 is a vertical cross-sectional view of a first form of the electrolytic cell of the present invention;

FIGURE 3 is a horizontal cross-sectional view of the cell shown in FIGURE 2 taken along line 3—3 thereof;

FIGURE 4 is a view in cross section of the connection of the chlorine discharge conduit to a venturi section forming a part of the water recirculating conduit of the pool;

FIGURE 5 is an electrical wiring diagram of the invention and that of the pool recirculating system;

FIGURE 6 is a top plan view of a first alternate form of cell;

FIGURE 7 is a vertical cross-sectional view of the device shown in FIGURE 6 taken on line 7—7 thereof; and FIGURE 8 is a second vertical cross-sectional view of the first alternate cell taken on line 8—8 of FIGURE 7.

With continuing reference to the drawings, and particularly to FIGURES 2 and 3 thereof, there is shown a first form of the electrolytic cell in accordance with this invention. In general, the cell includes an outer housing 11 and an inner housing 12 which have a common top plate 14. The inner housing 12 is shorter than the outer housing 11. An annular shaped chamber 15 is defined between the exterior of the inner housing 12 and the interior of the outer housing 11. A space 16 is defined between a bottom 17 of the outer housing 11 and a bottom 18 of the inner housing 12.

The bottom 18 of the inner housing 12 is a porous carbon diaphragm, as more fully described hereinafter. The top plate 14, bottom 17, and the cylindrical walls of the outer and inner housings 11 and 12 respectively, are preferably formed of a plastic material that is not adversely affected by chlorine and chloride compounds when in aqueous solution. The various connections between the walls, bottoms and top plate of the electrolytic cell are so formed that they are fluid-and-gas-tight.

For example, an outwardly directed flange 20 is provided at the top of a cylindrical wall of the outer housing 11, and the top plate 14 is bolted or otherwise affixed in sealing engagement with flange 20. An opening is formed in plate 14 through which a conduit 21 projects downwardly into a confined space 22 defined inside the inner housing 12. Conduit 21 is used to discharge brine into the space 22.

Similarly, a second opening is formed in plate 14 through which a chlorine discharge tube 23 extends to communicate with the confined space 22. Openings 24 are also formed in the top plate 14 which allow for the exhaust of hydrogen gas from the chamber 15 during the electrolytic process, as more fully described hereinafter. In addition, a liquid outlet 25 is provided through the wall of the outer housing 11, proximate the upper end thereof for the overflow of a sodium hydroxide solution which is also formed during the electrolytic process. It can be seen therefore, that the cell of the present invention can also be utilized for the production of NaOH.

A cylindrical metal screen or perforated cylindrical metal shell 27 is positioned within the annular chamber 15 which acts as the cathode of the electrolytic cell. An anode 30 of the cell of the present invention comprises a cylinder of porous carbon defined by a bottom 31 and side wall 32. A longitudinally extending space 33 is formed inside bottom 31 and side wall 32. A tubular electrical conducting member 34, preferably formed of graphite, is connected to anode 30 and extends through an opening in plate 14. Member 34 is in communication with space 33. An air passage 35 extends throughout the length of tubular member 34. Member 34 is suitably connected to the positive side of a source of electrical energy, as will be explained in detail hereinafter.

As is well known, when an electric current is passed through an aqueous alkaline metal chloride solution, chlorine is evolved at the anode in accordance with the formula $Cl^- - e = \frac{1}{2}Cl_2$. Hydrogen is evolved at the cathode. Since the deposition potential for hydrogen ions is less than the alkaline ions, hydrogen ions are set free in accordance with the following formula:

$$\begin{array}{r} H^+ + e = \frac{1}{2}H_2 \\ H_2O = H^+ + OH^- \\ \hline H_2O + e = \frac{1}{2}H_2 + OH^- \end{array}$$

Formation of alkali hydroxide, as well as evolution of hydrogen, takes place at the cathode. A quantity of alkali ions equivalent to the hydroxyl ions is available since an equivalent amount of Cl ions disappears from the solution through discharge at the anode. The alkali which accumulates in the neighborhood of the cathode must be prevented from coming into contact with the chlorine evolved at the anode if pure chlorine is to be obtained by the electrolysis, for otherwise the following reaction would occur, $2OH+Cl_2=Cl^-+ClO+H_2O$. Thus, hypochloride would be formed instead of the desired pure chlorine. The electrolytic cell of the present invention prevents this unwanted reaction from taking place.

Referring to FIGURES 2 and 3, when an electrical potential sufficient to decompose brine is introduced between the anode 30 and the cathode 27 of the first form of cell, with a sodium chloride solution present in the confined space 22, the desired chemical reaction will take place. The rate at which the brine (sodium chloride solution) is electrolyzed to form sodium hydroxide and chlorine gas is substantially dependent on the rate at which electrical energy is supplied to the cell. The rate at which electrical energy is supplied to the invention to sterilize the water in a swimming pool will be discussed in detail hereinafter.

The sodium chloride solution entering the interior chamber 22 through the conduit 21 is ionized by the electrical current to release chlorine in the confined space 22 which is exhausted through the chlorine discharge tube 23 due to the negative pressure head that is maintained thereon as will be described later. The electrical current can flow through the porous carbon bottom 18 into the cathode space between the interior and exterior housings, i.e., the chamber 15 and space 16. The electrical current thus liberates hydrogen at the cathode screen 27, which hydrogen escapes to the atmosphere through the openings 24.

Sodium hydroxide in liquid form passes outward from the annular chamber 15 through the outlet 25 at a rate of flow determined by the rate of flow of sodium chloride solution into the confined space 22. The porous carbon bottom 18 permits the free flow of high density electrical current because of its low specific resistance. In addition, bottom 18 is capable of differentiating between the specific gravities of the salt and caustic solutions, since it is a permeable carbon diaphragm. Thus, it allows the passage therethrough of sodium chloride solution while preventing the passage of sodium hydroxide solution therethrough. The magnitude of the negative pressure head impressed within the confined space 22 above the liquid level of the sodium chloride solution therein is limited by the passage of air to the space 22 through the porous anode 30. The space 33 in anode 30 is at substantially ambient atmospheric pressure due to the passage 35. The pressure differential between the interior and exterior of anode 30 causes the brine solution to rise within the space 22 by forced capillary action. The chlorine normally released on the surface and in the interior of anode 30 is freed therefrom by a continuous flow of air through the porous anode from space 33 to the housing 12 which has a negative pressure maintained therein. As a result of this removal of chlorine, the electrolytic reaction goes to completion, with the chlorine being swept up with the airstream and exhausted from confined space 22 through the discharge tube 23.

Application of the above described first form of cell to a swimming pool is illustrated in FIGURES 1 and 4 wherein the discharge tube 23 is connected to an eductor 41 that is inserted in the recirculating water discharge line 40 to the swimming pool 42. Line 40 extends from the discharge side of a pump 43 that is driven by an electric motor 44. Eductor 41 has a venturi-shaped passage 41a formed therein. As water is discharged through passage 41a, a zone of low pressure is formed therein whereby chlorine is drawn through tube 23. The chlorine intimately mixes and dissolves in the recirculated water as it flows through the zone of low pressure into the eductor 41.

The suction side of pump 43 is connected by a pipe 45 to a strainer 46. A second pipe 47 extends from strainer 46 to a suitable water inlet 48 in the pool 42. Motor 44, as shown in FIGURE 5, has two electrical conductors 50 and 51 connected thereto. A conventional timer 53 is provided which may be either clock or electrically driven, and includes an arm 54 fabricated from an electrical conducting material. Arm 54 is rotatably driven by means (not shown) to contact an arcuate electrical conducting member 55. Arm 54 is connected to conductor 51 at junction 51a, and member 55 is connected to conductor 51 at junction 51b. Conductors 50 and 51 are connected to a source of electric power 52.

A normally open relay 56 is provided that includes a solenoid 57 which is connected by conductors 58 and 59 to junctions 50a and 51c on conductors 50 and 51 (FIGURE 5). When the electrical circuit to the motor 44 is completed when the timer arm 54 contacts member 55, an armature 60 of the relay is pivoted to a position where it engages a contact 61. The electrical lead 28 extends from armature 60 to the cathode screen 27, as best shown in FIGURE 2.

Contact 61 is connected by an electrical conductor 62 to the negative terminal 63 of a second source of electrical power 64. Positive terminal 65 of source 64 is connected to a manually movable member 66 that is in movable contact with a resistance element 67 forming a part of a rheostat 68. Element 67 is connected by an electrical conductor 69 to the conducting member 34, as shown in FIGURE 5, which member is preferably formed of graphite. The second source of power will, under most circumstances, be a transformer that reduces a domestic source of electricity to a lower voltage.

Operation of the invention is relatively simple. After the first form of cell is installed, as shown in FIGURE 1, and wired, as shown in FIGURE 5, a brine solution is introduced into the interior thereof through a funnel 70 or other means connected to conduit 21, or the conduit 21 is connected to a reservoir (not shown) from which the brine may be delivered to the invention as needed.

When the pump 43 is driven by motor 44, water is recirculated from the pool 42 through the eductor 41 at a known rate. From the previous description of the wiring diagram shown in FIGURE 5, it will be apparent that such recirculation takes place only a desired portion of the day. The period of time or portions of a day is determined by the length of time the arm 54 is in contact with member 55.

Concurrently with completion of the electrical circuit to energize motor 44 to drive pump 43, the circuit is completed to electrically energize the circuit from the second source of power 64 to the first form of cell shown in FIGURE 2. Manual adjustment of the rheostat 68 governs the quantity of electrical energy flowing to the first form of cell, and this rate of flow of electrical energy in turn determines the rate at which chlorine will be evolved from the brine solution in the invention to be drawn through tube 23 to intimately mix with the water in the passage 41a.

It will be apparent that as the water recirculates through passage 41a it can be momentarily subjected to a high percentage concentration of chlorine if desired, sufficient to destroy any bacteria that may be present in the water. In hot weather chlorine gas escapes rapidly from the water after it recirculates back to the pool 42. However, this escape of chlorine is immaterial for if the water in pool 42 is recirculated three times a day, each portion of the water in the pool is subjected to a concentrated chlorine discharge every eight hours, which is sufficient to prevent any substantial multiplication of bacteria.

A first alternate form of electrolytic cell is shown in FIGURES 6, 7 and 8 in its simplest form. The device includes two rectangular, laterally separated sheets of steel which serve as cathodes 80. Four rectangular frames 82, 84, 86 and 88 are provided that are formed of hard rubber or a suitable polymerized resin. The frames 82, 84, 86 and 88 are disposed in side-by-side abutting contact, and define the top, bottom, and end walls of the cell.

One of the cathodes 80 is positioned adjacent the exterior surface of frame 82, and the other cathode in contact with the exterior surface of frame 88. When the cathodes 80 are so disposed they provide the side walls of the cell. Two metallic wire mesh screens 90 are provided that are of substantially the same dimensions as cathodes 80. One of the screens 90 has the edge portions thereof disposed between the adjacent surfaces of frames 82 and 84, and the other screen 90 has the edge portions thereof situated between the adjacent surfaces of frames 86 and 88.

The cathodes 80, frames 82, 84, 86 and 88, and screens 90 have aligned transverse bores formed therein through which bolts 92 extend to clamp them together in the configuration shown in FIGURES 6, 7 and 8. The top portions of frames 84 and 86 have a number of longitudinally spaced, vertically extending semi-circular grooves 84a and 86a formed therein which are transversely aligned. A number of carbon anode rods 94 extend downwardly through the vertical bores provided by the adjacent pairs of semi-circular grooves 84a and 86a. When in abutting contact bottoms of frames 84 and 86 define vertical cavities 96 in which the lower end portions of anode rods 94 are disposed.

The frames 84 and 86 also have aligned semi-circular grooves formed therein that define a chlorine discharge passage 98, a brine inlet passage 100, and an air inlet passage 102. Two liquid caustic discharge passages 104 and 106 are formed in the bottom portions of frames 82 and 88, as shown in FIGURE 8. The passage 98, 100, 102, 104 and 106 have suitable conduits 98a, 100a, 102a, 104a and 106a connected thereto. The screens 90 are bonded by means (not shown) to the adjacent faces of frames 82, 84, 86 and 88 to effect liquid and gas-tight seals therewith.

The wire screens 90, as can be seen in FIGURE 6, serve to subdivide the interior of the cell into an anode space 110 and two cathode spaces 112. A source of electrical energy E–1 is provided which is of sufficient magnitude to overcome the electrode-electrolyte losses and decompose brine when it is placed in the first alternate form of the invention.

The positive side of electrical source E–1 is connected by an electrical conductor 116 to each of the anodes 94, and the negative side of source E–1 by conductors 118 to the two cathodes 80. A second source of direct electrical energy E–2 is also provided, and is of such magnitude as to keep the screens 90 slightly more negative than the cathodes 80. The negative side of second source E–2 is connected by two electrical conductors 120 to the screens 90. The positive side of electrical source E–2 is connected by electrical conductors 122 to cathodes 80. Two hydrogen discharge openings 82b and 88b are formed in the top portions of frames 82 and 88, and permit hydrogen to discharge from the anode spaces 112 to the atmosphere or other desired space.

The first alternate form of cell is used by first filling the same with brine by use of the inlet 100. Electrical energy is then allowed to flow from the sources. E–1 and E–2 to the brine. The virtual reaction effected by the flow of electrical current to the first alternate form of the cell is:

(1) 
(Cathode)   (Anode)

The overall reaction taking place at the cathode may be represented by the equation:

(2) 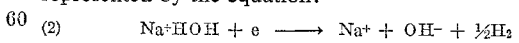

During electrolytic decomposition of the brine in the first alternate form of cell, the OH⁻ ions produced at the cathodes as shown in Equation 2, were it not for screens 90, would migrate toward the anodes 94 and combine with the chlorine released there to produce hypochlorite. The function of the screens 90 in the first alternate form of the cell is to repel the migration of the negatively charged hydroxyl OH⁻ ions toward the anodes 94 by the greater negative charge provided on the screens by the electrical source E–2. The screens 90 are sufficiently coarse in mesh as to permit free flow of brine solution therethrough.

During the electrolysis of the brine, the chlorine ions Cl⁻ move toward the anode rods 94. Sodium ions Na⁺ and oxonium ions $H_3O^+$ move toward the cathodes 80. The only ions which are not permitted to move freely are the $OH^-$ ions formed at the cathodes 80. Movement of the $OH^-$ ions is restrained due to the action of the negatively charged screens 90. Thus, as the electrolysis reaction takes place, the strength of caustic soda in the cathode spaces 112 is increased, with concurrent discharge of hydrogen through passages 88b. If a negative head is maintained at discharge passage 98, chlorine will be withdrawn as formed in the first alternate cell in the same manner as in the first cell previously described. Due to the high specific gravity of the concentrated caustic solution, the caustic solution settles to the lower portions of the first alternate form of the cell, and can be withdrawn through the conduits 104a and 106a.

A model of the first alternate form of cell has been built and tested. The anodes 94 are 5/8" graphite rods, 7" in length, and were spaced on 2½" centers. Screens 90 were formed of stainless steel and were of 50 mesh. The brine used was 2½ lbs. of sodium chloride in one gallon of water (25% solution).

Decomposition voltage, E–1, 5 volts
Screen voltage, E–2, 1.5 volts

The test was conducted continuously for six hours with the following results:

Decomposition current, 1.5 amperes
Screen current, 100 ma.
pH cathode solution, 12.45
NaOH, 2 grams/liter
pH anode solution, 7.3

The first alternate form of the cell can be used in conjunction with a swimming pool in the same manner as the cell shown in FIGURE 2. When the first alternate form of cell is so used, the conduit 98a is connected to eductor 41 rather than the discharge tube 23. Also, the cell can be used separately in the production of caustic soda substantially free of chlorides if desired. The purpose of the air inlet passage 102 is to prevent formation of a substantial negative head inside the first alternate form of the invention when the conduit 98a is connected to the eductor 41 in the same manner as in the first form of electrolytic cell described hereinabove.

Although the present invention is fully capable of achieving the objects and providing the advantages hereinbefore shown and described, it is to be understood that it is merely illustrative of the presently preferred embodiments thereof and I do not mean to be limited to the details of construction herein shown and described, other than as defined in the appended claims.

I claim:
1. A water sterilizing apparatus in combination with a swimming pool having a water recirculation system that includes a pump, a suction line extending from the interior of said pool to said pump, an electric motor which drives said pump, and a discharge line that returns water from said pump to said pool, which apparatus comprises:
 (a) an eductor on said discharge line, which eductor has a restricted throat of such transverse cross section that a substantial negative pressure is formed therein as said water discharges therethrough;
 (b) an electrolytic cell that generates chlorine gas only in a confined space therein at a predetermined rate, which confined space is in communication with the ambient atmosphere;
 (c) conduit means for conducting chlorine from said confined space to said throat, with the differential in pressure between said negative pressure and the pressure in said confined space being such as to cause air from the ambient atmosphere and chlorine gas at said predetermined rate to flow from said confined space to said throat, which chlorine gas dissolves in said water discharging through said throat, with said air flowing to said throat mixing with said water flowing through said throat and escaping therefrom into the ambient atmosphere after said water with which it is mixed is discharged into said pool;
 (d) a first normally open electrical circuit capable of supplying electrical energy to said motor when closed;
 (e) a timer that periodically closes said first circuit;
 (f) a second normally open electrical circuit capable of supplying electrical energy to said cell to cause the same to generate chlorine gas at said predetermined rate when said second circuit is closed; and
 (g) means for concurrently closing said second circuit with the closing of said first circuit.

2. A water sterilizing apparatus as defined in claim 1 wherein said electrolytic cell comprises:
 (a) an outer housing;
 (b) an inner housing positioned within said outer housing and defining an annular chamber therebetween;
 (c) a chlorine gas outlet from said inner housing;
 (d) an anode in said inner housing;
 (e) means for introducing a sodium chloride solution into said inner housing;
 (f) a metal cathode in said annular chamber;
 (g) means for supplying electrical energy to said anode and cathode at a sufficient voltage to decompose said sodium chloride solution;
 (h) electrical conducting means forming a part of said inner housing for maintaining a sodium hydroxide solution formed at said cathode out of contact with said chlorine; and
 (i) means for discharging said sodium hydroxide solution only from said outer housing.

3. A water sterilizing apparatus as defined in claim 1 wherein said circuit further includes adjustable resistance means for controlling the rate of flow of electrical energy through said second circuit to said cell for causing said chlorine to be generated in said cell at said predetermined rate.

4. A water sterilizing apparatus as defined in claim 1 wherein said electrolytic cell comprises: an inner housing; a permeable carbon diaphragm that forms a part of said inner housing and cooperates therewith to define a confined space; an outer housing in which said inner housing and diaphragm are disposed, with said inner housing and diaphragm and outer housing cooperatively defining a chamber therebetween; means for introducing an aqueous brine solution into said inner housing; a chlorine outlet in communication with said confined space; a permeable carbon anode in said inner housing and in contact with said brine introduced into said inner housing; a cylindrical metal cathode in said chamber, said cathode having a plurality of openings formed therein; means for supplying electrical energy to said anode and cathode at a sufficient voltage to decompose said brine into sodium hydroxide and chlorine, which diaphragm permits said brine to pass therethrough to said chamber but prevents flow of a sodium hydroxide solution from said chamber to said confined space to react with said chlorine; means for venting the interior of said anode to the atmosphere for air to be drawn through said anode to carry said chlorine therewith when a negative head is maintained on said chlorine outlet; and means for discharging said sodium hydroxide solution from said outer housing.

5. A water sterilizing apparatus as defined in claim 1 wherein said electrolytic cell comprises: two laterally separated electrical conducting cathode plates; an electrical conducting anode disposed between said plates; two electrical conducting screens of substantially the same dimensions as said plates located between said anode and said plates; a plurality of frame members formed of a non-electrical conducting material that sealingly engage one another and the edge portions of said plates and screens to cooperate therewith in providing a housing, with said anode extending through said frame members into said housing, said screens and members defining an enclosed anode space therebetween, and said screens, plates and members defining two enclosed cathode spaces therebetween that are situated on opposite sides of said anode space; means for charging an aqueous brine solution into said anode space; a first electrical circuit that supplies electrical energy to said anode and cathode plates at a sufficient voltage to decompose said brine solution when in said anode and cathode spaces into chlorine and sodium hydroxide, with said chlorine only forming in said anode space, and sodium hydroxide only forming in said cathode space; a second electrical circuit that maintains said screens at a sufficient negative electrical potential to prevent migration of hydroxyl ions to said anode and chlorine ions to said cathode during said electrical decomposition of said brine solution; means for allowing air to flow into said housing from the ambient atmosphere during said electrical decomposition; and means for withdrawing said aqueous sodium hydroxide from said cathode spaces as said sodium hydroxide forms during said electrical decomposition.

6. A water sterilizing apparatus as defined in claim 5 wherein said anode is a plurality of parallel carbon rods in spaced relationship that extend through, and are sealingly held in openings formed in said members.

7. A water sterilizing apparatus as defined in claim 5 wherein said means for allowing air to flow into said housing is an opening extending through said members and situated above the highest level to which said brine solution will rise in said housing.

8. A water sterilizing apparatus as defined in claim 5 wherein said means for introducing said brine is an opening that extends through said members and is in communication with said anode space.

9. A water sterilizing apparatus as defined in claim 5 wherein said means for withdrawing said sodium hydroxide solution comprises two openings formed in said members which are in communication with said cathode spaces.

References Cited by the Examiner
UNITED STATES PATENTS

| | | | |
|---|---|---|---|
| 1,012,809 | 12/1911 | Bull | 210—192 |
| 1,167,705 | 1/1916 | McDonald | 204—266 |
| 1,277,378 | 9/1918 | Case | 210—62 |
| 1,806,801 | 5/1931 | Higgins | 204—229 |
| 2,228,264 | 1/1941 | Freedley | 204—266 |
| 2,370,087 | 2/1945 | Stuart | 204—266 |
| 2,546,254 | 3/1951 | Briggs | 204—266 |
| 2,820,701 | 1/1958 | Leslie | 210—169 |
| 2,882,210 | 4/1959 | Jenks | 204—152 |
| 2,887,444 | 5/1959 | Lindstaedt | 204—152 |
| 2,985,307 | 5/1961 | Grasmere | 210—169 |
| 2,999,797 | 9/1961 | Campbell | 210—62 |
| 3,092,566 | 6/1963 | Negus | 204—240 |
| 3,102,085 | 8/1963 | Edwards | 204—266 |

FOREIGN PATENTS 286,993   12/1913   Germany.

REUBEN FRIEDMAN, *Primary Examiner.*

HERBERT L. MARTIN, JOHN H. MACK, *Examiners.*